(12) United States Patent
Unruh et al.

(10) Patent No.: US 6,996,285 B2
(45) Date of Patent: Feb. 7, 2006

(54) QUALITY RATING FUNCTION FOR A DISCRETE DECODED PICTURE

(75) Inventors: Christian Unruh, Stuttgart (DE); Miguel Estevez, Griesheim (DE); Peter Wagner, Waiblingen (DE)

(73) Assignee: Sony International (Europe) GmbH, Berlin (DE)

( * ) Notice: Subject to any disclaimer, the term of this patent is extended or adjusted under 35 U.S.C. 154(b) by 638 days.

(21) Appl. No.: 09/964,935

(22) Filed: Sep. 27, 2001

(65) Prior Publication Data

US 2002/0076119 A1    Jun. 20, 2002

(30) Foreign Application Priority Data

Sep. 28, 2000   (EP) ................................. 00121123

(51) Int. Cl.
*G06K 9/46*    (2006.01)

(52) U.S. Cl. ..................................................... 382/251
(58) Field of Classification Search ........ 382/251–253; 375/240.01–241
See application file for complete search history.

(56) References Cited

U.S. PATENT DOCUMENTS

| | | | | |
|---|---|---|---|---|
| 5,629,778 A | * | 5/1997 | Reuman ...................... | 382/252 |
| 5,995,151 A | * | 11/1999 | Naveen et al. .......... | 375/240.24 |
| 6,028,967 A | | 2/2000 | Kim et al. | |

FOREIGN PATENT DOCUMENTS

| EP | 0 797 349 | 9/1997 |
|---|---|---|
| EP | 0 886 444 | 12/1998 |

OTHER PUBLICATIONS

Suthaharan S. et al. "A distortion measure for blocking artifacts in digital video" Proc. ICICS 1997 IEEE, vol. 3, pp. 1566-1569, Sep. 1997.*
Liu et al. "Objective image quality fro block-based DCT coding" Consumer Electronics, IEEE transction on, vol. 43, p 511-516, Jun. 1997.*
Lakhani et al., "Measuring defects in image restored using DCT processing approaches" Proc. IEEE Symposium on Computer Based Medical Systems, 1998, pp. 175-180, Jun. 1998.*
Shigenobu Minami et al.: *"An Optimization Approach For Removing Blocking Effects In Transformcoding"* IEEE Transactions on Circuits and Systems for Video Technology, US, IEEE Inc. New York, vol. 5, No. 2, Apr. 1, 1995, pp. 74-82, XP000509193.
Hyun Wook Park et al: *"A Postprocessing Method for Reducing Quantization Effects in Low Bit-Rate Moving Picture Coding"* IEEE Transactions on Circuits and Systems for Video Technology, vol. 9, No. 1, Feb. 1999, pp. 161-171.

* cited by examiner

*Primary Examiner*—Jingge Wu
(74) *Attorney, Agent, or Firm*—Frommer Lawrence & Haug LLP; William S. Frommer (57) ABSTRACT

In a method to rate a discrete decoded picture ($P_{in}$) in respect to its quality a picture quality rating function (PQRF) is calculated on basis of an information about artefacts (ARI) within the discrete decoded picture and a coding information (CRI) which was used for discrete coding the picture. Preferably, said method is used to determine a preferred discrete picture decoding and/or postprocessing method and/or to determine a preferred discrete picture encoding and/or pre-processing method.

14 Claims, 5 Drawing Sheets

QUALITY RATING FUNCTION FOR A DISCRETE DECODED PICTURE

The present invention relates to a method to rate a discrete decoded picture in respect to its quality by calculating a picture quality rating function.

Generally, picture coding/compression standards like JPEG or MPEG are based on block-based discrete cosine transformation (DCT) encoding. Therefore, a loss of quality might arise within an encoded image, such as blocking or ringing artefacts.

Different methods are proposed to reduce such a loss of quality, like from H. W. Park, Y. L Lee "A Postprocessing Method For Reducing Quantization Effects And Low Bit-Rate Moving Picture Coding", IEEE Transactions on Circuit Systems For Video Technology, Vol. 9, No. 1, February 1999, pages 161–171, and by S. Minami, A. Zakhor "An Optimization Approach for Removing Blocking Effects in Tranform Coding", IEEE Transactions on Circuits and Systems for Video Technology, Vol 5, No. 2, April 1995, pages 74 to 82.

In particular, according to the first mentioned described postprocessing method blocking artefacts are reduced by one-dimensional horizontal and vertical lowpass filtering and the ringing noise is reduced by two-dimensional signal-adaptive filtering. Since such restoration techniques for removing blocking effects are described to result in unnecessary blurring of the image in the latter mentioned paper, a new approach is proposed therein which exploits the correlation between the intensy values of boundary pixels of two neighbouring blocks. This approach is based on the theoretical and empirical observation that under mild assumptions quantization of the DCT coefficients of two neighbouring blocks increases the expected value of the mean squared difference of slope (MSDS) between the slope across two adjacent blocks, and the average between the boundary slopes of each of the two blocks. Since the amount of this increase is dependent upon the width of quantization intervals of the transformed coefficients among all permissible inverse quantized coefficients the set of DCT coefficients which reduces the expected value of this MSDS by an appropriate amount is most likely to decrease the blocking effect.

To judge systems for transmission and/or storing of video signals generally a subjective quality of the reproduced moving pictures with a set data rate is considered. However, since such a subjective judgement requires a big effort different objective models, i.e. algorithms which can be implemented in computerized systems and rate the picture quality without any human influence, are developed to judge different post and/or preprocessing methods as well as encoding and/or decoding methods for enhancing the picture quality.

F. Fechter "Ein heuristisch optimiertes Modell zur objektiven Beurteilung der Qualität komprimierter Bildfolgen", 18. Jahrestagung der Fernseh- und Kinotechnischen Gesellschaft, Erfurt, Tagungsband (1998), Seiten 518–527 discloses such a model which objectively rates the quality of compressed pictures by comparing the picture to be rated with the original picture and optimizing this model with the help of data retrieved by a subjective test.

Further, M. Trauberg "Qualitätsmessung von MPEG-codierten Bildfolgen—Anwendung und Verfahren", 18. Jahrestagung der Fernseh- und Kinotechnischen Gesellschaft, Erfurt, Tagungsband (1898), Seiten 505–517 discloses a picture quality monitoring in MPEG-based transmission systems which only analyzes the processed pictures and calculates a rating for a picture degradation without knowledge of the original picture. Therefore, a statistical blocking indicator is determined on basis of the knowledge that the differences inbetween neighbouring pixels are reduced within coded blocks and are statistically enhanced with a high probability across block boundaries. Therefore, to calculate the statistical blocking indicator which is a measure for degradation of quality due to an MPEG-coding the amplitude values of neighbouring pixels are numerically evaluated. However, the calculated statistical blocking indicator can wrongly indicate blocking where actually no blocking is within the picture which leads to a wrongly applied de-blocking filter with a result in loss of quality, i.e. smearing. Therefore, the main purpose of the statistical blocking indicator seems to indicate the result of a block-grid-detection, since it identifies clearly where within the picture block-boundaries might be.

However, this proposed method to rate the picture quality without using the original signal as reference signal might in some cases strongly deviate from the subjective quality rating of the digital processed data. Further, it is described that in particular only the quality deterioration resulting from the MPEG encoding is rated and therewith only a rating of different source pictures can be performed in view of the corresponding MPEG-coded pictures and not a rating of different encoding/decoding schemes as well as pre- and/or postprocessing methods, e.g. performed on the same picture.

Therefore, it is the object underlying the present invention to provide a method to rate a discrete decoded picture in respect to its quality which does not only reflect deteriorations resulting from the MPEG-coding, but also subjective quality improvements based upon different pre- and/or post-processing methods as well as different encoding and/or decoding schemes.

This object is solved by the method to rate a discrete decoded picture in respect to its quality as defined in independent claim 1. Preferred embodiments thereof are respectively defined in the dependent claims 2 to 10.

Two preferred applications of the method according to the present invention are defined in claims 11 and 12 and a computer program product embodying the method according to the present invention is defined in claim 13.

The method to rate a discrete decoded picture in respect to its quality according to the present invention is characterized by calculating a picture quality rating function on basis of information about artefacts within the discrete decoded picture and coding information which was used for discrete coding the picture.

Therewith, the present invention is not only applicable to MPEG coded pictures but to all kinds of discrete encoded and decoded pictures. Further, the combination of considering these two objective features ensures that the rating method is adaptable more or less identical to a subjective quality rating of digital processed data.

Preferably, said information about artefacts is a criterium of discontinuity and said coding information is a scaling factor. In this case, the objective measurable criteria within the decoded picture are chosen so that the most important unconsciously considered features during subjective quality rating are reflected.

Further preferably, said scaling factor is retrieved from the discrete decoded picture on basis of a number of bits used for discrete coding the picture. Since this number of bits is either preset for different coding methods and/or transmitted together with the picture data and/or directly retrievable therefrom, the scaling factor can be determined independently of the MPEG-bitstream and therewith the picture quality rating function calculated according to the present invention does not use the original signal as reference signal. Therefore, the present invention enables the calculation of a picture quality rating without reference signal and a low or medium calculation complexity in comparison with the methods according to the prior art. Further, an online (on-the-fly) implementation is possible. Of course, this invention is also applicable to discrete coding methods that use a transformation which is not based on DCT (Discrete Cosine Transform) as long as the coding related information might be extracted from the received bit-stream, comparable to the extraction of the scaling factor from the MPEG-bit-stream in case of MPEG-coding which is based on the DCT.

Alternatively or additionally, the criterium of discontinuity is based on a rating of transitions in-between neighboured blocks of the discrete decoded picture. Further preferably, in this case the rating of transitions in-between neighboured blocks is dependent on at least one respective main gradient and one respective subgradient of a transition in-between neighboured blocks.

Therewith, according to the present invention, the discontinuity criteria described by S. Minami and A. Zakhor in "An optimization approach for removing blocking effects in transform coding" which is referenced above are used.

Further preferably, transition in-between neighboured blocks are rated based on a sum of a squared difference of a respective main gradient and an interpolated value of respective subgradients adjacent to the main gradient of a transition in-between neighboured blocks.

Therewith, it is possible to very reliable provide an objective criterium for determining discontinuity within a picture similar to subjective observations. In particular, this method considers a visual effect of block boundaries only in case the change at the boundary is bigger than the change within the block. Therefore, a high gradient of a block boundary is not regarded to be a coding artefact in case it is desired, i.e. in case the subgradients also show similar values.

Still further preferably, the rating of transitions in-between neighboured blocks is based on a sum of all transitions in-between neighboured blocks. In this case, a criterium of discontinuity for the whole picture is built.

The picture quality rating function according to the present invention is preferably determined distinct in respect to horizontal and vertical transitions.

Further preferably, said picture quality rating function indicates a maximum quality in case the scaling factor indicates a high correlation with the picture and/or in case the criterium of discontinuity indicates a small discontinuity.

Still further preferably, said picture quality rating function represents a sum of a first function dependent on the criterium of discontinuity and a second function dependent on the scaling factor. Therewith, both functions can be determined independently to rate the picture quality. This leads to a particular advantage in case the rating is performed on the transmitter side, i.e. encoder side of the transmission chain, since in this case the second function which is dependent on the scaling factor can be easily retrieved from the encoder of the picture and has not to be determined from the decoded picture.

Further preferably, said first and second functions have the general structure $$f(x) = k \cdot e^{-x/\gamma} + d,$$

with k and $\gamma$ being scaling factors and d represents an offset.

In this case, further preferably, said first function is defined by $$f_1(MSDS) = 100 \cdot e^{-MSDS/1000}$$

and said second function is defined by $$f_2(M_{Quant}) = 100 \cdot e^{-M_{Quant}/5}.$$

In this case, the same tendency of the picture quality rating function is achieved as with subjective tests. In other words, the calculated picture quality rating function leads to a clear statement which of the tested methods is better or not so good in comparison to the other methods.

The picture quality rating function calculated according to the present invention is preferably applicable to discrete cosing transform functions, but—as stated above—is not limited thereto.

The method according to the present invention is preferably used to determine a preferred picture decoding and/or postprocessing method or accuracy.

Alternatively or additionally, the method according to the present invention is preferably used to determine a preferred discrete picture encoding and/or preprocessing method or accuracy.

A computer program product according to the present invention comprises computer program means adapted to perform all the steps as defined in the method to rate a discrete decoded picture in respect to its quality according to the present invention or anyone of its preferred embodiments as described above when said program is executed on a computer.

Further features and advantages of the present invention are elucidated by the following description of preferred embodiments thereof taken in conjunction with the accompanying drawings, wherein.

Figure 1:
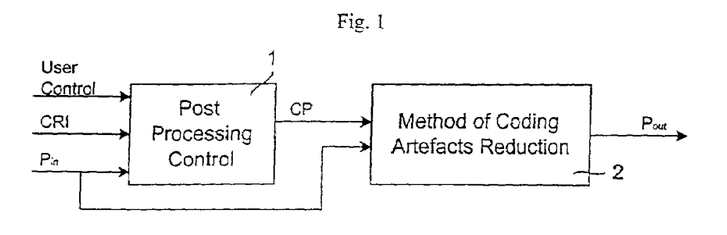
FIG. 1 shows a preferred application of the present invention wherein the method to rate a discrete decoded picture is used as postprocessing control.

FIG. 1 shows a first preferred application of the method according to the present invention, namely the use of the quality rating according to the present invention to determine a suitable postprocessing method, e.g. a suitable method for coding artefacts reduction for images/sequences. Basically, the picture quality rating is performed within a postprocessing control module 1 which outputs a control parameter CP which is input into a filter 2 which also receives an incoming picture Pin to determine a suitable method of coding artefacts reduction so that a picture Pout with enhanced image quality will be output from the filter 2. The postprocessing control module 1 also receives the incoming picture $P_{in}$ and coding related information CRI to perform the picture quality rating according to the present invention according to which the control parameter CP is derived to determine the suitable method of coding artefacts reduction. The determination of a suitable method could e.g. be to apply strong or weak filters and/or to select appropriate filters for each (horizontal and vertical) block boundary or selected groups thereof within the picture seperately. Optionally, the postprocessing control module comprises a further input for user control so that the control parameter CP might be determined based on user specified parameters.

Alternatively to this embodiment, the postprocessing control module 1 can also receive several pictures each of which is already processed with a respective different method of coding artefacts reduction to relatively judge which of the input pictures has the best quality and will be output to a user.

Figure 2:
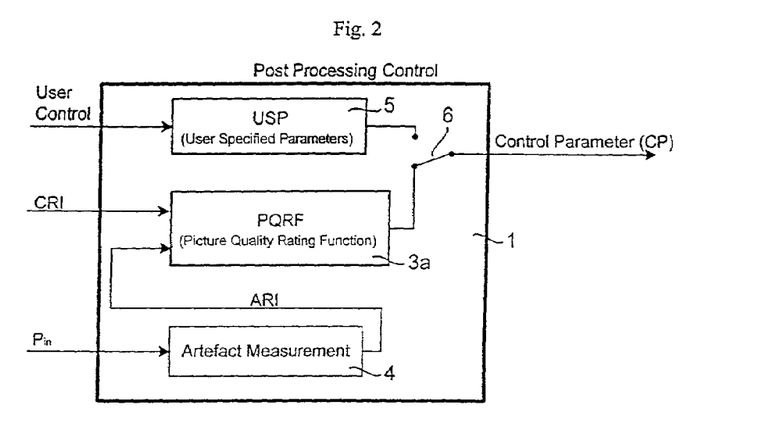
FIG. 2 shows the postprocessing control of FIG. 1 in more detail with a first embodiment of a picture quality rating function according to the present invention.

FIG. 2 shows the postprocessing control module 1 shown in FIG. 1 in more detail. The postprocessing control module 1 comprises a first embodiment of a picture quality rating function 3a according to the present invention (first picture quality rating function 3a in the following), an artefact measurement unit 4 and—as mentioned above—optionally user-specified parameters 5. The artefact measurement unit 4 receives the incoming picture $P_{in}$ to calculate artefact-related information ARI which serves as one input parameter to the first picture quality rating function 3a. The first picture quality rating function 3a further receives the coding-related information CRI as second input parameter to calculate the control parameter CP according to which a suitable method of coding artefact reduction is selected within the filter 2. A switch 6 within the post-processing control module 1 is used in case the control parameter CP can be determined on basis of user-specified parameters to select whether the output signal of the first picture quality rating function 3a or one of the user-specified parameters 5 is output as control parameter CP. One of the user-specified parameters 5 is selected according to a user control.

Figure 3:
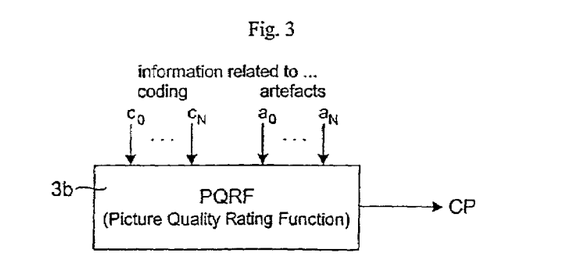
FIG. 3 shows a second embodiment of a picture quality rating function according to the present invention.

FIG. 3 shows a second embodiment of a picture quality rating function 3b according to the present invention. In contrast to the first embodiment shown in FIG. 2 the coding-related information CRI and the artefact related information ARI used to calculate the control parameter CP is not only a respective single value, but is respectively represented by N+1 single values, namely information related to coding by $c_O$ to CN and information related to artefacts by $a_O$ to $a_N$.

Of course, the first and second preferred embodiments of the picture quality rating function according to the present invention might also be combined or information related to coding might comprise N+1 parameters and information related to artefacts might comprise M+1 parameters, wherein N and M are positive integers including 0.

Therewith, according to the present invention, a numerical value, i.e. the control parameter CP, is calculated by the picture quality rating function PQRF only based on information that can be extracted from the bit stream and/or calculated criteria for a specific kind of artefacts. This numerical value represents the picture quality and also reflects the same rating that can be achieved by subjective analysis of the according picture. The dependencies of the input data, i.e. the information related to coding and to artefacts, is highly correlated with the specific kind of artefact for which this rating function should be applied. Therefore, different picture quality rating functions for different kinds of artefacts can be designed by providing an environment that combines the input information to a single numerical value. In general, the picture quality rating function can be formulated as following:

$$PQRF = f(\text{coding related information, artefact related information})$$

as also described in connection with FIG. 3.

Figure 4:
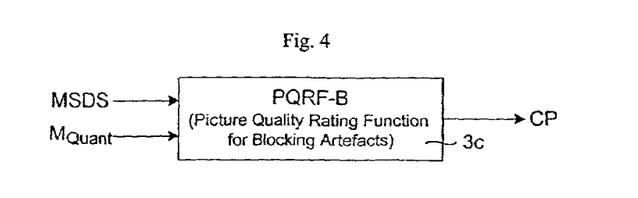
FIG. 4 shows a third embodiment of a picture quality rating function according to the present invention.

FIG. 4 shows the picture quality rating function according to a third preferred embodiment of the present invention, namely a picture quality rating function adapted for blocking artefacts. This third picture quality rating function 3c according to the third preferred embodiment of the present invention which can be applied in order to rate different algorithms for reducing/removing blocking artefacts can be designed by accurate information about this particular artefacts and by coding specific information and is therefore in the following named PQRF-B. In this case, the artefact related information is built by a modified form of the mean squared difference of slope (MSDS), which mean squared difference of slope is designed by S. Minami and A. Zakhor as described in the paper "An Optimization Approach For Removing Blocking Effects In Transform Coding" which is referenced above. Further, the coding specific information for the PQRF-B 3c is built by a scaling factor $M_{Quant}$ of quantization which is directly dependent on the bits needed for coding a block.

For the PQRF-B 3c which is a function of two input values and which is preferably a sum of two functions each dependent on one input value, i.e.

$$PQRF\text{-}B = f(MSDS, M_{Quant}) = f_1(MSDS) + f_2(M_{Quant})$$

in the following first the criterium of discontinuity MSDS is described and thereafter the scaling factor $M_{Quant}$.

The gradient in-between two pixels which are adjacent to each over a block boundary indicates the change of the pixel values and therefore can be used to determine if blocking is present or not. However, no low picture quality shall be indicated in case the gradient of two adjacent pixels which are located in different blocks has a relatively high value, but no blocking is present. Therefore, as mentioned above, according to the present invention not only the main gradient, i.e. the gradient at the block boundary is observed, but also the subgradients, i.e. the gradient preceding and succeeding the main gradient.

Figure 5:
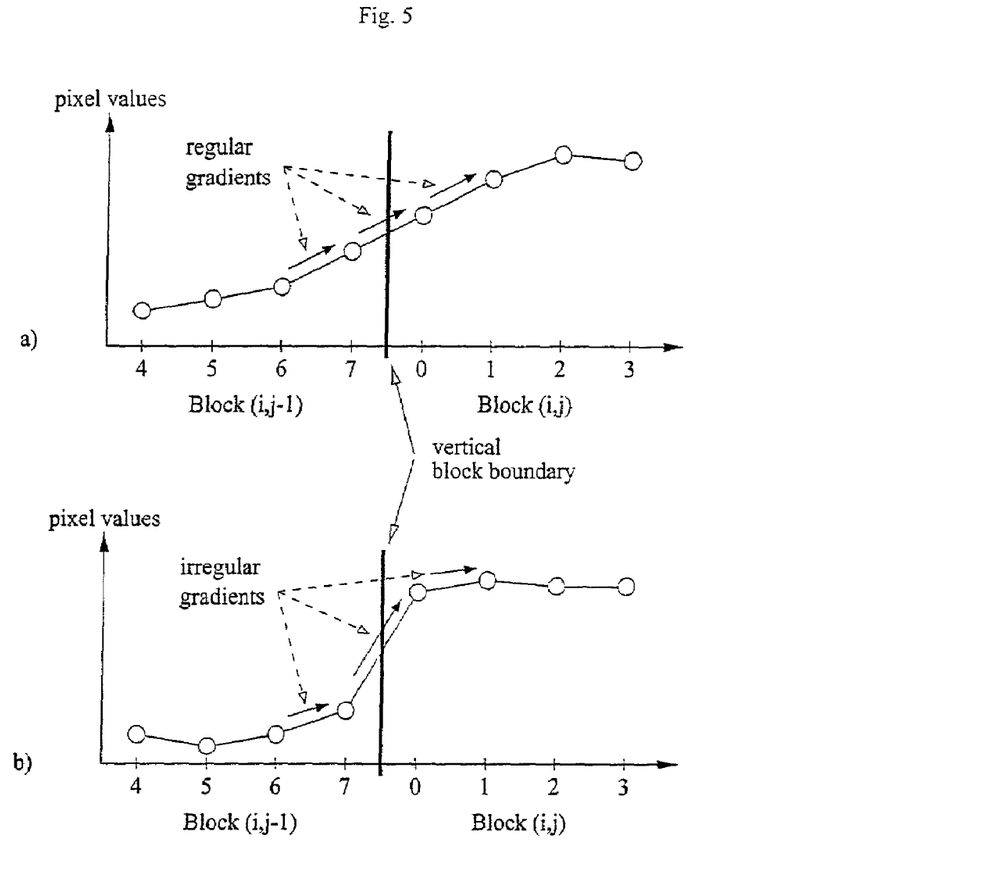
FIG. 5 elucidates the determination of a first input parameter for the picture quality rating function according to the third preferred embodiment of the present invention.

FIG. 5a shows a block boundary with regular gradients inbetween the pixel values at the border of two neighbouring blocks and FIG. 5b shows a block boundary with irregular gradients, i.e. with values of the subgradients considerably smaller than that of the main gradient, i.e. FIG. 5b shows a case in which blocking inbetween two neighbouring blocks occurs.

Figure 6:
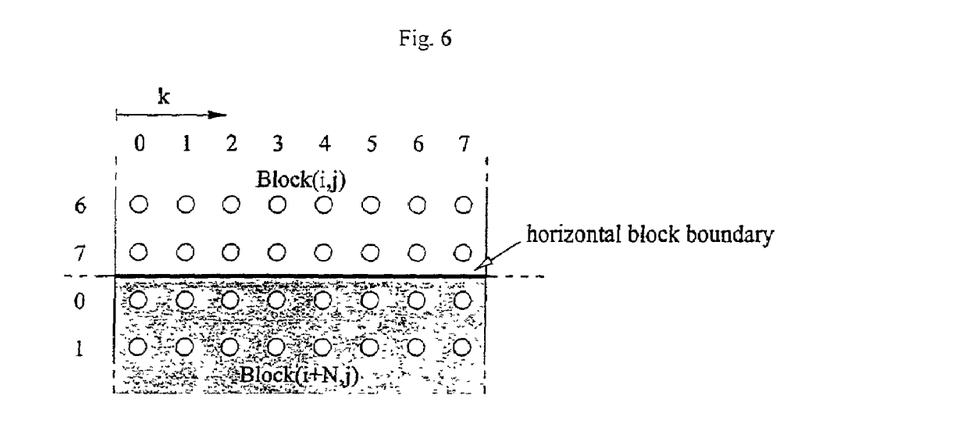
FIG. 6 shows the relevant pixels for the calculation of the first input parameter.

Since a reliable judgement of blocking can not only be based on the main gradient, as shown above, according to the present invention the mean squared difference of slope is preferably calculated by building a squared difference of a respective main gradient and an interpolated value of two respective subgradients adjacent to the main gradient as described in "An optimization approach for removing blocking effects in transform coding" by S. Minami and A. Zakhor. Since further preferably all pixels at the border of two neighbouring blocks are considered to judge whether blocking occurs on that transition 32 pixels serve as a basis for calculating an MSDS value for a transition inbetween blocks of 8×8 pixels, as it is shown in FIG. 6, namely two rows of pixels adjacent to the transitions within each block for a vertical transition and two lines of pixels adjacent to the block boundary for a horizontal transition.

It is possible to provide different weighting factors for the main gradient and the mean of the subgradients.

To calculate a mean squared difference of slope for one block either a mean or a sum of all transitions inbetween neighbouring blocks is built. Alternatively, the building of the criterium of discontinuity MSDS might also be calculated distinct in respect to the horizontal and vertical directions. In this case, two MSDS values are calculated, namely one representing the mean or sum of all vertical transitions and one representing the mean or sum of all horizontal transitions. According to the present invention preferably the criterium of discontinuity for one block is represented by only a single block boundary, respectively for the horizontal and vertical directions. Therefore, in this case the needed calculation power is reduced in comparison with the methods according to the prior art.

Figure 7:
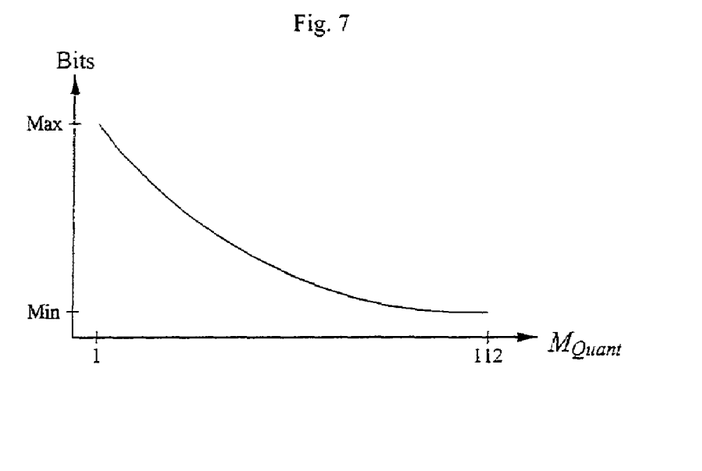
FIG. 7 shows a graph representing a number of bits used for coding a picture in dependency upon a used scaling factor.

For MPEG coding the scaling factor $M_{Quant}$ is directly dependent on the bits needed for coding one block. Further, it is generally known that an increasing scaling factor $M_{Quant}$ leads to an increasing number of DCT coefficients which are quantized to 0 (zero) and a decreasing scaling factor $M_{Quant}$ leads to a decreasing number of DCT coefficients which are quantized to 0 (zero). Since only DCT coefficients are transmitted which are not quantized to 0 (zero) generally the number of bits transmitted for one block represents on average the used scaling factor. FIG. 7 shows a function representing the necessary bits for coding one block in dependency on the use scaling factor $M_{Quant}$. This curve can be expressed by an exponential function with negative exponent which indicates a maximum number of bits for a scaling factor $M_{Quant}=1$ and a minimum number of bits for a scaling factor $M_{Quant}=112$. Of course, these values of the scaling factor which are adapted to MPEG coding and decoding represent only relative values.

Since the picture quality rating function according to the third preferred embodiment of the invention, namely the PQRF-B 3c shall only represent a tendency of the quality of the rated picture the following features have to be fulfilled based on the above considerations:

In case the scaling factor $M_{Quant}$ is small no blocking effects will occur independently from the criterium of discontinuity MSDS. Therefore, the considered transition should be rated as to have a high quality.

Figure 8:
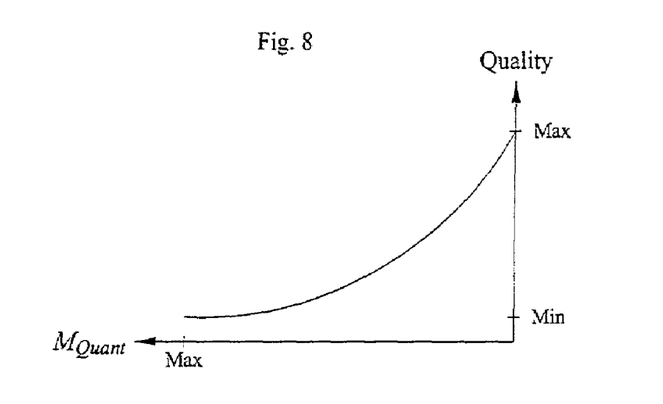
FIG. 8 shows a graph representing the picture quality in dependency on the used scaling factor which represents said first input parameter of the picture quality rating function according to the third preferred embodiment of the present invention.
Figure 9:
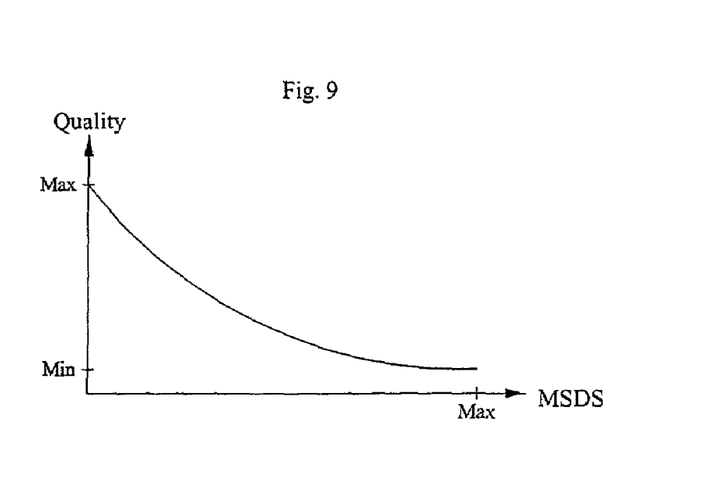
FIG. 9 shows a graph representing the picture quality in dependency on a second input parameter of the picture quality rating function according to the third preferred embodiment of the present invention.

In case the criterium of discontinuity MSDS of the considered transition is relatively low, the quality thereof should be regarded as high independently of the used scaling factor $M_{Quant}$ The quality of a picture to be rated decreases with decreasing scaling factor $M_{Quant}$ or decreasing criterium of discontinuity MSDS respectively exponentially, as it is indicated qualitatively in FIG. 8 for the scaling factor $M_{Quant}$ and in FIG. 9 for the criterium of discontinuity MSDS.

Since each of the curves shown in FIGS. 8 and 9 can be approximated by the following function:

$$f(x) = k \cdot e^{-x/\gamma} + d,$$

with k and γ being scaling factors and d representing an offset it can be concluded that the PQRF-B 3c has the following structure $$PQRF\text{-}B = f(MSDS, M_{Quant}) = (k_1 \cdot e^{-MSDS/\alpha} + d_1) + (k_2 \cdot e^{-MQuant/\beta} + d_2).$$

Figure 10:
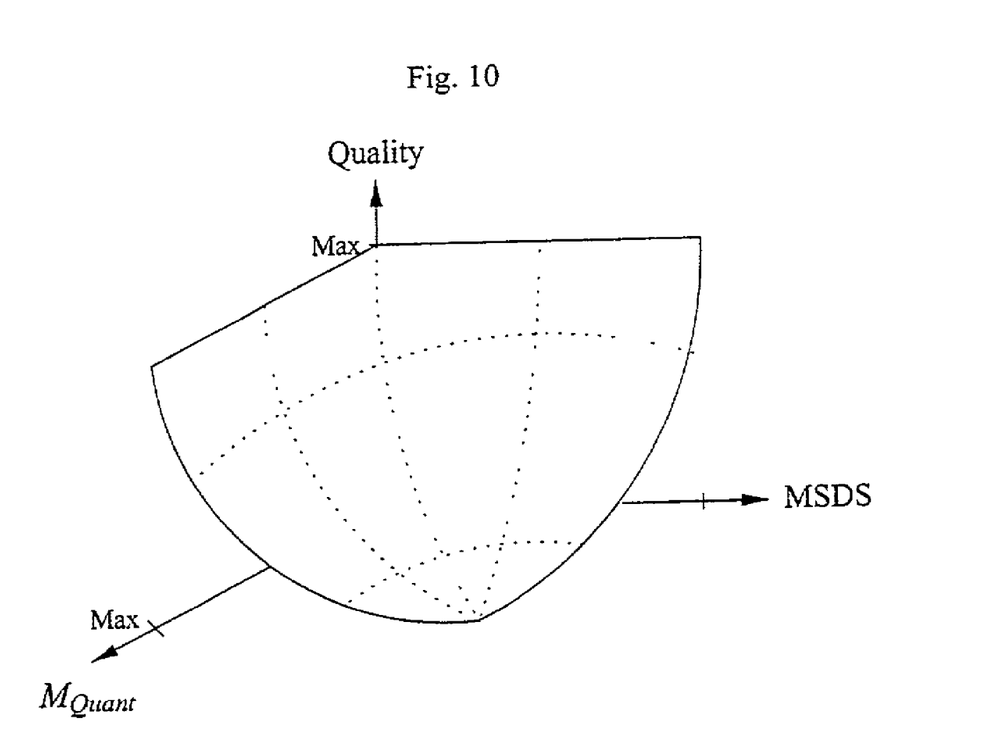
FIG. 10 shows a three-dimensional graph representing the picture quality rating function according to the third preferred embodiment of the present invention, i.e. the picture quality in dependency on the first and second input parameters.

This three-dimensional function is shown in FIG. 10.

To bring the PQRF-B 3c into a range so that it corresponds to subjective test results, the following values are preferably used for the scaling factors $k_1$, $k_2$, α and β and the offset values $d_1$ and $d_2$:

$$k_1 = k_2 = 100$$

$$d_1 = d_2 = 0$$

$$\alpha = 1000$$

$$\beta = 5.$$

Factors which lie within the range of those values result in a broad rating which is similar to that of subjective tests on the same material. According to the present invention, preferably an interpolated numerical value is calculated which represents the quality of all transitions in horizontal and vertical directions. Therefore, preferably the picture quality rating function PQRF-B 3c of the third preferred embodiment according to the present invention is calculated distinct in respect to horizontal and vertical transitions, i.e. one picture quality rating function represents a mean value of all horizontal transitions and one picture quality rating function represents a mean value of all vertical transitions.

Figure 11:
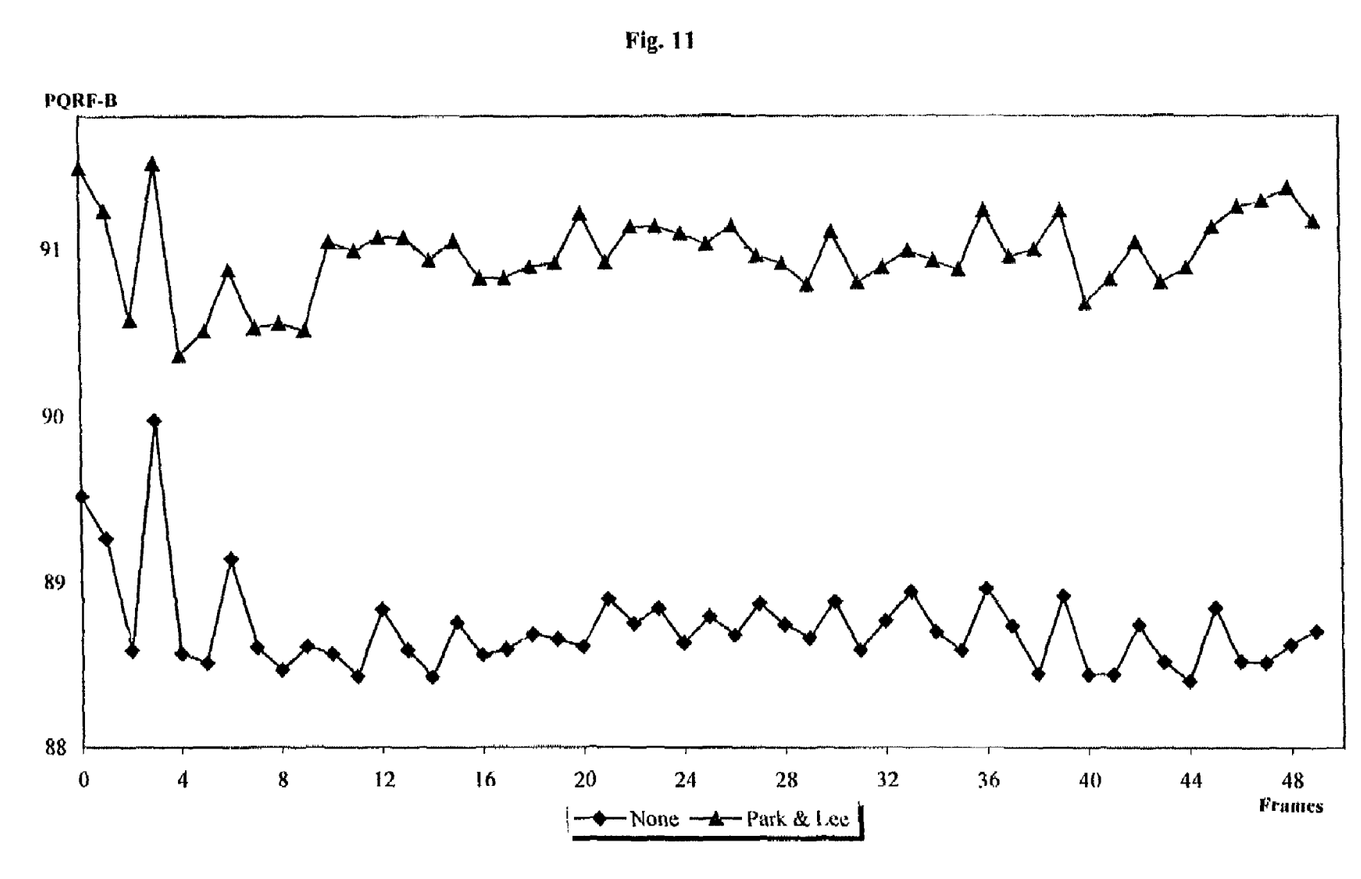
FIG. 11 shows results of a picture quality rating of not postprocessed and postprocessed pictures.

FIG. 11 shows an example of a rating of horizontal transitions of a 50 frame picture sequence once for a not postprocessed decoded sequence and once for the same, but postprocessed version of the decoded sequence. The picture quality rating function in respect to the horizontal transitions basically shows the same characteristics for both sequences, but in all instances the postprocessed version of the decoded sequence achieves a higher numerical quality value, i.e. control parameter CP.

What is claimed is:

1. Method to rate a discrete decoded picture in respect to its quality, comprising:

calculating a picture quality rating function (PQRF; PQRF-B) on a basis of an information about artefacts (ARI; MSDS) within the discrete decoded picture and a coding information (CRI; $M_{Quant}$) that was used for discrete coding of the picture, wherein the information about artefacts (ARI) is a criterion of discontinuity (MSDS) and the coding information (CRI) is a scaling factor ($M_{Quant}$), wherein the picture quality rating function represents a sum of a first function dependent on the criterion of discontinuity (MSDS) and a second function dependent on the scaling factor ($M_{Quant}$), and wherein the first and second functions have the general structure $$f(x) = k \cdot e^{-x/\gamma} + d$$

with k and γ being scaling factors and d represents an offset.

2. Method according to claim 1, characterized by retrieving said scaling factor ($M_{Quant}$) from the discrete decoded picture on basis of a number of bits used for discrete coding the picture.

3. Method according to claim 1, characterized by determining said criterion of discontinuity (MSDS) based on a rating of transitions in-between neighbored blocks of the discrete decoded picture.

4. Method according to claim 3, characterized by rating transitions in-between neighbored blocks dependent on at least one respective main gradient and one respective sub gradient of a transition in-between neighbored blocks.

5. Method according to claim 3, characterized by rating transitions in-between neighbored blocks based on a sum of a squared difference of all respective main gradients and all respective sub gradients of a transition in-between neighbored blocks.

6. Method according to claim 3, characterized by rating transitions in-between neighbored blocks based on a sum of all transitions in-between neighbored blocks.

7. Method according to claim 1, characterized by determining said picture quality rating function (PQRF-B) distinct in respect to horizontal and vertical transitions.

8. Method according to claim 1, characterized in that said picture quality rating function indicates a maximum quality in case the scaling factor ($M_{Quant}$) indicates a high correlation with the picture.

9. Method according to claim 1, characterized in that said picture quality rating function indicates a maximum quality in case the criterion of discontinuity (MSDS) indicates a small discontinuity.

10. Method according to claim 1, characterized in that said first function is defined by $$f_1(MSDS) = 100 \cdot e^{-MSDS/1000}$$

and said second function is defined by $$f_2(M_{Quant}) = 100 \cdot e^{-M_{Quant}/5}.$$

11. Method according to claim 1, characterized in that said discrete coding/decoding is based on a discrete cosine transform function.

12. Use of the method defined in claim 1 to determine a preferred discrete picture decoding and/or post-processing method.

13. Use of the method defined in claim 1 to determine a preferred discrete picture encoding and/or pre-processing method.

14. Computer program product comprising computer program means adapted to perform all the steps defined in claim 1 when said program is executed on a computer.

* * * * *